United States Patent
Bae et al.

(10) Patent No.: US 11,801,494 B2
(45) Date of Patent: Oct. 31, 2023

(54) METHOD FOR PREPARING SINGLE-ATOM CATALYST SUPPORTED ON CARBON SUPPORT

(71) Applicant: KOREA INSTITUTE OF SCIENCE AND TECHNOLOGY, Seoul (KR)

(72) Inventors: Sukang Bae, Jeollabuk-do (KR);
Seoung-Ki Lee, Jeollabuk-do (KR);
Dae-Young Jeon, Jeollabuk-do (KR);
Myung Jong Kim, Jeollabuk-do (KR);
Nam Dong Kim, Jeollabuk-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 86 days.

(21) Appl. No.: 17/271,206

(22) PCT Filed: Nov. 6, 2019

(86) PCT No.: PCT/KR2019/014958
§ 371 (c)(1),
(2) Date: Feb. 25, 2021

(87) PCT Pub. No.: WO2020/096338
PCT Pub. Date: May 14, 2020

(65) Prior Publication Data
US 2021/0394161 A1    Dec. 23, 2021

(30) Foreign Application Priority Data

Nov. 8, 2018   (KR) .......................... 10-2018-0136808

(51) Int. Cl.
*B01J 23/75*     (2006.01)
*B01J 23/755*    (2006.01)
(Continued)

(52) U.S. Cl.
CPC ............. *B01J 23/755* (2013.01); *B01J 21/02* (2013.01); *B01J 21/18* (2013.01); *B01J 23/464* (2013.01);
(Continued)

(58) Field of Classification Search
CPC . B01J 21/02; B01J 21/18; B01J 23/464; B01J 23/468; B01J 23/745; B01J 23/75;
(Continued)

(56) References Cited

U.S. PATENT DOCUMENTS

2019/0264325 A1*   8/2019   Prinz ................. C23C 16/45534

FOREIGN PATENT DOCUMENTS

| CN | 106944057 A | 7/2017 |
| CN | 108409579 A | 8/2018 |

(Continued)

OTHER PUBLICATIONS

International Search Report dated Feb. 13, 2020 for PCT/KR2019/014958.
(Continued)

*Primary Examiner* — Brian A McCaig
(74) *Attorney, Agent, or Firm* — CANTOR COLBURN LLP

(57) ABSTRACT

Provided is a method for manufacturing a single-atom catalyst supported on a carbon support, including treating a mixture of a precursor of a carbon support and a precursor of a hetero element other than carbon through a dry vapor phase process, thereby supporting, on a carbon support, a single-atom catalyst containing a hetero element other than carbon.

21 Claims, 11 Drawing Sheets

(51) Int. Cl.
    *B01J 21/02*     (2006.01)
    *B01J 21/18*     (2006.01)
    *B01J 23/46*     (2006.01)
    *B01J 23/745*    (2006.01)
    *B01J 27/02*     (2006.01)
    *B01J 27/14*     (2006.01)
    *B01J 37/02*     (2006.01)

(52) U.S. Cl.
    CPC ........... *B01J 23/468* (2013.01); *B01J 23/745* (2013.01); *B01J 23/75* (2013.01); *B01J 27/02* (2013.01); *B01J 27/14* (2013.01); *B01J 37/0215* (2013.01)

(58) Field of Classification Search
    CPC . B01J 23/755; B01J 27/02; B01J 27/14; B01J 27/20; B01J 37/0201; B01J 37/0207; B01J 37/215; B01J 37/347
    See application file for complete search history.

(56) References Cited

FOREIGN PATENT DOCUMENTS

| | | |
|---|---|---|
| JP | 2014100617 A | 6/2014 |
| KR | 1020140092642 A | 7/2014 |
| KR | 1020160012549 A | 2/2016 |
| KR | 1020170021590 A | 2/2017 |
| KR | 1020180090175 A | 8/2018 |

OTHER PUBLICATIONS

Korean Notice of Allowance for KR Application No. 10-2018-0136808 dated Oct. 23, 2020.

Korean Office Action for KR Application No. 10-2018-0136808 dated Feb. 27, 2020.

* cited by examiner

METHOD FOR PREPARING SINGLE-ATOM CATALYST SUPPORTED ON CARBON SUPPORT

TECHNICAL FIELD

The disclosure relates to a method for manufacturing a single-atom catalyst supported on a carbon support.

BACKGROUND ART

Metal-supported catalysts are widely used in various industrial fields due to their high activity, selectivity, and stability, and in order to maximize the use of precious metals, studies have been conducted to highly disperse metals in a small size.

In particular, single-atom-sized metal catalysts exhibit different catalytic activities due to different electrical properties from general metal catalysts as well as high metal dispersion. Further, such catalysts may maximize catalytic activities, and exhibit high chemoselectivity due to extremely limited active sites compared to catalysts having metal clusters with multiple active sites, and thus are attracting great attention.

However, single-atom-sized metals are quite unstable due to a tendency to agglomerate in order to maximize their surface energy. Therefore, single-atom-sized metal catalysts may be synthesized only when catalyst supports having strong bonds with metals to stabilize the metals even in a single atom size are used. The catalyst supports having strong bonds with metals to stabilize the metals even in a single atom size are mostly insulators or ceramics. Since such insulators or ceramic supports have excellent mechanical strength, in order to introduce metal atoms, a top-down approach has been used to introduce strong energy (e.g., using ball mill) after adsorbing metal atoms. However, insulators or ceramic supports have low electrical conductivity and are unstable under electrochemical conditions, and thus, it is almost impossible to apply the single-atom-sized metal catalysts supported on such supports to an electrochemical reaction. Therefore, there is a need for catalyst supports capable of stabilizing metals even in a single atom size while having high electrical conductivity.

DESCRIPTION OF EMBODIMENTS

Technical Problem

An aspect is to provide a method for manufacturing a single-atom catalyst supported on a carbon support.

Solution to Problem

According to an aspect,
there is provided a method for manufacturing a single-atom catalyst supported on a carbon support, including: treating a mixture of a precursor of a carbon support and a precursor of a hetero element other than carbon through a dry vapor phase process to support, on a carbon support, a single-atom catalyst containing a hetero element other than carbon.

Advantageous Effects of Disclosure

According to an aspect, a method for manufacturing a single-atom catalyst supported on a carbon support may, through a bottom-up approach, introduce a single-atom catalyst material into a carbon lattice when generating a carbon support, thereby manufacturing a single-atom catalyst supported on a carbon support having high crystallinity and a large specific surface area.

The single-atom catalyst supported on the carbon support has excellent electrical conductivity, and has excellent catalytic activity and selectivity as the single-atom catalyst is evenly dispersed on the carbon support.

MODE OF DISCLOSURE

Figure 1:
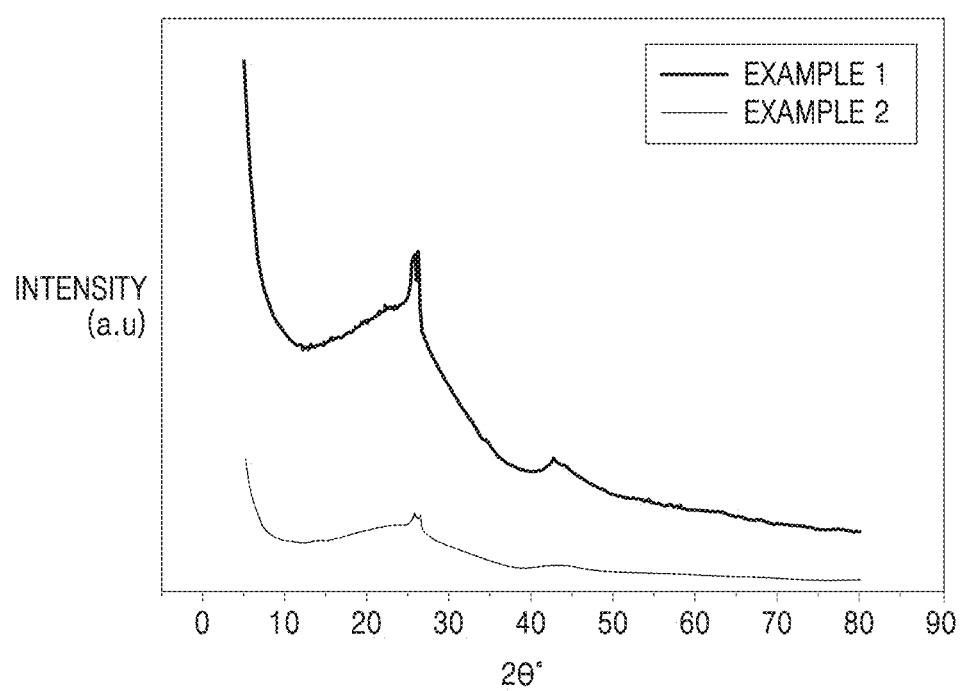
FIG. 1 is results of X-ray diffraction (XRD) of a carbon structure doped with nitrogen (N) of Example 1 and a carbon structure doped with cobalt (Co) and nitrogen (N) together of Example 2.

Hereinafter, a method for manufacturing a single-atom catalyst supported on a carbon support according to example embodiments will be explained in more detail.

The method for manufacturing a single-atom catalyst supported on a carbon support according to an embodiment includes treating a mixture of a precursor of a carbon support and a precursor of a hetero element other than carbon through a dry vapor phase process to support, on a carbon support, a single-atom catalyst containing a hetero element other than carbon.

According to the manufacturing method of the disclosure as described above, hetero elements are evenly dispersed in the form of a single atom on a carbon support to manufacture a supported catalyst.

The method for manufacturing a single-atom catalyst supported on a carbon support according to the disclosure is characterized in that a catalyst material is introduced into a carbon lattice in the form of a single atom in the manufacturing of a carbon support having high crystallinity.

The method for manufacturing a single-atom catalyst supported on a carbon support according to the disclosure is based on a bottom-up approach, which allows a carbon support having high crystallinity and a large specific surface area to be manufactured. When a conventional top-down approach is applied, there is a limitation that a carbon support has reduced electrical conductivity due to high chances of a crystal structure of the carbon support being destroyed to cause a decrease in crystallinity.

According to the manufacturing method of the disclosure as described above, the catalyst material is evenly dispersed in the form of a single atom on the carbon support to generate a supported catalyst, thereby providing excellent catalytic activity and selectivity.

The precursor of the carbon support refers to a raw material of the carbon support, and may be selected from, for example, graphite, $C_2H_2$, $CH_4$, $C_2H_4$, $C_2H_6$, and $C_2H_5OH$, but is not limited thereto, and may include one type alone or two or more types.

For example, when performing are discharge according to an embodiment of the disclosure, graphite may be used, and when using vapor phase growth, $C_2H_2$, $CH_4$, $C_2H_4$, $C_2H_6$, etc. may be used.

The hetero element of the hetero element precursor refers to a single-atom hetero element other than carbon, supported on a carbon support, and may include, for example, a non-metal, a metal other than carbon, or a combination thereof. For example, the hetero element of the hetero element precursor may include at least one non-metal selected from nitrogen (N), boron (B), sulfur (S), selenium (Se), phosphorus (P), fluorine (F), chlorine (Cl), bromine (Br), and iodine (I); at least one metal selected from Sc, Ti, V, Cr, Mn, Fe, Co, Ni, Cu, Zn, Y, La, Zr, Hf, Nb, Ta, Mo, W, Tc, Re, Ru, Os, Rh, Ir, Pd, of Pt, Ag, Au, Cd, Hg, Ga, Ge, In, Sn, Sb, Tl, Pb, Bi, lanthanides, and actinides; or a combination thereof. For example, the precursor of the hetero element other than carbon may include at least one non-metal-containing precursor containing at least one non-metal selected from nitrogen (N), boron (B), sulfur (S), and phosphorus (P); at least one metal-containing precursor containing at least one metal selected from Ti, V, Cr, Mn, Fe, Co, Ni, Cu, Zn, Mo, W, Ru, Rh, Ir, Pd, Pt, Ag, Au, Cd, Ga, Ge, In, Sn, Sb, and Tl; or a combination thereof. For example, the hetero element of the hetero element precursor may include at least one non-metal selected from nitrogen (N), boron (B), sulfur (S), selenium (Se), phosphorus (P), fluorine (F), chlorine (Cl), bromine (Br), and iodine (I); at least one metal among cobalt (Co), iron (Fe), nickel (Ni), rhodium (Rh), and iridium (Ir); or a combination thereof. For example, the hetero element of the hetero element precursor may include nitrogen (N), cobalt (Co), or a combination thereof. For example, the hetero element of the hetero element precursor may include nitrogen (N) and cobalt (Co) together. For example, the hetero element of the hetero element precursor may include nitrogen (N) or cobalt (Co).

The precursor of the hetero element refers to a raw material of a hetero element supported on a carbon support. For example, the precursor of the hetero element may include at least one non-metal-containing precursor containing at least one non-metal selected from nitrogen (N), boron (B), sulfur (S), selenium (Se), phosphorus (P), fluorine (F), chlorine (Cl), bromine (Br), and iodine (I); at least one metal-containing precursor containing at least one metal selected from Sc, Ti, V, Cr, Mn, Fe, Co, Ni, Cu, Zn, Y, La, Zr, Hf, Nb, Ta, Mo, W, Tc, Re, Ru, Os, Rh, Ir, Pd, of Pt, Ag, Au, Cd, Hg, Ga, Ge, In, Sn, Sb, Tl, Pb, Bi, lanthanides, and actinides; or a combination thereof. For example, the precursor of the hetero element may include at least one non-metal-containing precursor containing at least one non-metal selected from nitrogen (N), boron (B), sulfur (S), selenium (Se), phosphorus (P), fluorine (F), chlorine (Cl), bromine (Br), and iodine (I); at least one transition metal-containing precursor containing at least one transition metal selected from cobalt (Co), iron (Fe), nickel (Ni), rhodium (Rh), and iridium (Ir); or a combination thereof.

According to an embodiment, the nitrogen-containing precursor may include at least one selected from $N_2$, $NH_3$, $N_2H_4$, $R_xNH_{3-x}$ (R is a $C_1$ to $C_6$ alkyl group, and x is 1 or 2), $R_xN_2H_{4-x}$ (R is a $C_1$ to $C_6$ alkyl group, and x is an integer of 3 or less), a solid inorganic material containing a nitrogen element, and a nitrogen element-containing polymer, but is not limited thereto.

According to an embodiment, the metal-containing precursor may include $CoCl_2$, $CoBr_2$, $Co(NO_3)_2$, $Co(OH)_2$, $Co(CH_3COO)_2$, $FeCl_2$, $FeBr_2$, $Fe(NO_3)_2$, $Fe(OH)_2$, $Fe(CH_3COO)_2$, $NiCl_2$, $NiBr_2$, $Ni(NO_3)_2$, $Ni(OH)_2$, $Ni(CH_3COO)_2$, $RhCl_2$, $RhBr_2$, $Rh(NO_3)_2$, $Rh(OH)_2$, $Rh(CH_3COO)_2$, $IrCl_2$, $IrBr_2$, $Ir(NO_3)_2$, $Ir(OH)_2$, $Ir(CH_3COO)_2$, etc., but is not necessarily limited thereto, and may include one type alone or two or more types. For example, $CoCl_2$ may be used as a precursor of cobalt (Co), but it is not necessarily limited thereto, and all metal precursors other than carbon are applicable as long as the purpose is to have the precursors supported on a carbon carrier.

The amount of the precursor of the hetero element in the mixture may be about 0.01% by weight to about 10% by weight with respect to the total weight of the precursor of the carbon support. For example, the amount of the precursor of the hetero element in the mixture may be about 0.05% by weight to about 8% by weight with respect to the total weight of the precursor of the carbon support. For example, the amount of the precursor of the hetero element in the mixture may be about 0.1% by weight to about 5% by weight with respect to the total weight of the precursor of the carbon support. For example, the amount of the precursor of the hetero element in the mixture may be about 0.2% by weight to about 4% by weight with respect to the total weight of the precursor of the carbon support. When the amount of the precursor of the hetero element in the mixture is within the above range, the hetero element may be evenly dispersed in the form of a single atom on the carbon support, and accordingly, catalytic activity and selectivity may be excellent.

The mixture of the precursor of the carbon support and the precursor of the hetero element may be a solid, a liquid, a gas, or a mixture thereof. For example, the mixture of the precursor of the carbon support and the precursor of the hetero element may be in a mixed state of a solid and a gas. For example, the mixture of the precursor of the carbon support and the precursor of the hetero element may be in a mixed state of a solid and a gas. When the mixture is in a liquid state, alcohol (e.g., ethanol) or water may be used as a solvent, but is not limited thereto. The solvent may be used alone or in combination of two or more.

According to an embodiment of the disclosure, carbon support growth used in the method for manufacturing a single-atom catalyst supported on a carbon support is not particularly limited as long as the process used therein is a dry vapor phase process.

According to an embodiment, the dry vapor phase process may be performed through at least one process among arc discharge, thermal chemical vapor deposition, plasma synthesis, high-temperature plasma, plasma-enhanced chemical vapor deposition, laser evaporation, laser ablation, and vapor phase growth.

According to an embodiment, the dry vapor phase process may be performed through arc discharge.

The arc discharge may be performed at a voltage of about 10 V to about 50 V. For example, the arc discharge may be performed at a voltage of about 20 V to about 40 V. For example, the arc discharge may be performed at a voltage of about 25 V to about 35 V. The arc discharge may be performed at a current of about 50 A to about 300 A. For example, the arc discharge may be performed at a current of about 100 A to about 200 A. For example, the arc discharge may be performed at a current of about 150 A to about 200 A. When the voltage and current of the arc discharge are controlled within the above range, the single-atom catalyst is evenly dispersed on the carbon support to manufacture a supported catalyst.

According to an embodiment, in the method for manufacturing a single-atom catalyst supported on a carbon support, a dry vapor phase process may be performed in a gas atmosphere of a non-metal-containing precursor. According to an embodiment, in the method for manufacturing a single-atom catalyst supported on a carbon support, arc discharge may be performed in a gas atmosphere of a non-metal-containing precursor. For example, when a reaction chamber is filled with a nitrogen-containing gas and then precursor powder of a carbon support is arc-discharged, nitrogen (N) may be evenly dispersed at the level of a single atom on the generated carbon support. For example, when a reaction chamber is filled with a nitrogen-containing gas, and then mixed powder of a carbon support precursor and a transition metal precursor is arc-discharged, nitrogen (N) and a transition metal may be evenly dispersed at the level of a single atom on the generated carbon support.

The single-atom catalyst supported on the carbon support manufactured by the method above may include a carbon support and a single-atom catalyst dispersed on the support.

The single-atom catalyst refers to a catalyst in the form that a single atom, which is the smallest in size that a catalyst material has, is dispersed on a support. The single-atom catalyst supported on the carbon support is characterized in that a catalyst material containing a hetero element other than carbon is evenly dispersed at the level of a single atom on a carbon support having excellent electrical conductivity. The characteristics allow the single-atom catalyst supported on the carbon support to have excellent electrical conductivity compared to a conventional nano-sized catalyst, and to have excellent catalytic activity and selectivity.

The carbon support refers to a carbon-based material having a large specific surface area and high crystallinity. For example, the carbon support may include graphene, graphene oxide, fullerene, carbon nanotubes (CNT), carbon nanofibers, carbon nanobelts, carbon nanoonions, carbon nanohorns, activated carbon, graphite, etc., but is not necessarily limited thereto, and any carbon supports that may be used as a carbon support in the art are all applicable.

The carbon support may have a structure such as a spherical shape, a rod shape, a tube shape, a horn shape, and a plate shape, but is not necessarily limited to such structures, and any structures that may be used as a carbon support in the art are all applicable. For example, the carbon support may be a porous carbon material having a large specific surface area and pores.

According to an embodiment, the carbon support is a nanohorn having a horn-shaped structure.

The carbon support may be porous. For example, the carbon support may be mesoporous. For example, in the carbon support, some or all of the various types of carbon supports described above may be porous.

The carbon support may have an average diameter of about 1 nm to about 10 μm. For example, the carbon support may have an average diameter of about 10 nm to about 5 μm. For example, the carbon support may have an average diameter of about 100 nm to about 1 μm. For example, the carbon support may have an average diameter of about 200 nm to about 500 nm. When the carbon support has an average diameter within the above range, the catalyst may be evenly dispersed in the form of a single atom on the carbon support, and catalytic activity and selectivity are excellent.

The term "single-atom catalyst" indicates that a catalyst material is dispersed as single-atom units together and evenly supported on a carbon support, and the single-atom catalyst is distinct from nanoparticles or microparticles formed of agglomerated catalyst materials, which are supported on a carbon support. The catalyst material is dispersed as single atom units together on a carbon support, and thus, the catalyst has excellent activity and selectivity.

The single-atom catalyst may include all hetero elements other than carbon. For example, the single-atom catalyst may include a non-metal, a metal other than carbon, or a combination thereof. For example, the single-atom catalyst may include at least one non-metal selected from nitrogen (N), boron (B), sulfur (S), selenium (Se), phosphorus (P), fluorine (F), chlorine (Cl), bromine (Br), and iodine (I); a transition metal; or a combination thereof. For example, the single-atom catalyst may include at least one non-metal selected from nitrogen (N), boron (B), sulfur (S), selenium (Se), phosphorus (P), fluorine (F), chlorine (Cl), bromine (Br), and iodine (I); at least one transition metal selected from cobalt (Co), iron (Fe), nickel (Ni), rhodium (Rh), and iridium (Ir); or a combination thereof. For example, the single-atom catalyst may include nitrogen (N), cobalt (Co), or a combination thereof. For example, the single-atom catalyst may include nitrogen (N) and cobalt (Co) together. For example, the single-atom catalyst may include nitrogen (N) or cobalt (Co).

The supported amount of the single-atom catalyst may be about 0.01% by weight to about 10% by weight with respect to the total weight of the carbon support. For example, the supported amount of the single-atom catalyst may be about 0.05% by weight to about 8% by weight with respect to the total weight of the carbon support. For example, the supported amount of the single-atom catalyst may be about 1% by weight to about 5% by weight with respect to the total weight of the carbon support. For example, the supported amount of the single-atom catalyst may be about 2% by weight to about 4% by weight with respect to the total weight of the carbon support. When the supported amount of the single-atom catalyst is within the above range, the catalyst may be evenly dispersed in the form of a single atom on the carbon support, and catalytic activity and selectivity are excellent.

The single-atom catalyst supported on the carbon support has excellent electrical conductivity and excellent catalytic activity and selectivity, and accordingly, the single-atom catalyst may be used in electrochemical or chemical reaction fields where conventional nano-sized or micro-sized catalysts are not applicable or hard to be applicable. For example, the single-atom catalyst may be used for fuel cells, highly sensitive biosensors, or chemical conversion reactions.

The disclosure will be explained in more detail referring to examples and comparative examples hereinafter. However, the examples are for illustrating the disclosure, and the scope of the disclosure is not limited thereto.

(Manufacturing of Carbon Nanohorn Structure Having a Single Atom Supported Therein)

Example 1: Nitrogen (N) Single Atom Supported on a Carbon Support 100 g of graphite powder was washed with ethanol and dried in an oven at 50° C. for 2 hours to completely evaporate a solvent, and then the resultant was fully filled into a cylindrical negative electrode with an empty center and sufficiently dried in an oven to remove moisture.

For are discharge, the negative electrode was introduced into a reaction chamber, and the chamber was charged with a nitrogen atmosphere, and then a voltage of 30 V and a current of 150 A were applied thereto for 5 minutes to generate an intense arc. The product was cooled and washed with ethanol to manufacture a carbon structure doped with nitrogen (N).

Example 2: Cobalt (Co) and Nitrogen (N) Single Atoms Supported Together on a Carbon Support 0.1 g of $CoCl_2$ was mixed with ethanol, and then 100 g of graphite powder was added to the mixture and stirred. Thereafter, the mixed solution was dried in an oven at 50° C. for 2 hours to completely evaporate the solvent to manufacture composite powder having $CoCl_2$ adsorbed on a surface of the graphite. The obtained composite powder was fully filled in a cylindrical negative electrode with an empty center, and then sufficiently dried in an oven to remove moisture.

For are discharge, the negative electrode was introduced into a reaction chamber, and the chamber was charged with a nitrogen atmosphere, and then a voltage of 30 V and a current of 150 A were applied thereto for 5 minutes to generate an intense arc. The product was cooled and washed with ethanol to manufacture a carbon structure doped with cobalt (Co) and nitrogen (N) together.

Example 3: Cobalt (Co) Single Atom Supported on a Carbon Support

A carbon structure doped with cobalt (Co) was manufactured in the same manner as in Example 2, except that a hydrogen atmosphere was applied instead of a nitrogen atmosphere.

Example 4: Iron (Fe) Single Atom Supported on a Carbon Support

A carbon structure doped with iron (Fe) was manufactured in the same manner as in Example 2, except that a hydrogen atmosphere was applied instead of a nitrogen atmosphere, and $FeCl_2$ was used instead of $CoCl_2$.

Example 5: Nickel (Ni) Single Atom Supported on a Carbon Support

A carbon structure doped with nickel (Ni) was manufactured in the same manner as in Example 2, except that a hydrogen atmosphere was applied instead of a nitrogen atmosphere, and $NiCl_2$ was used instead of $COCl_2$.

Example 6: Rhodium (Rh) Single Atom Supported on a Carbon Support

A carbon structure doped with rhodium (Rh) was manufactured in the same manner as in Example 2, except that a hydrogen atmosphere was applied instead of a nitrogen atmosphere, and $RhCl_2$ was used instead of $CoCl_2$.

Example 7: Iridium (Ir) Single Atom Supported on a Carbon Support

A carbon structure doped with iridium (Ir) was manufactured in the same manner as in Example 2, except that a hydrogen atmosphere was applied instead of a nitrogen atmosphere, and $IrCl_2$ was used instead of $CoCl_2$.

Example 8: Boron (B) Single Atom Supported on a Carbon Support

A carbon structure doped with boron (B) was manufactured in the same manner as in Example 1, except that a boron atmosphere was applied instead of a nitrogen atmosphere.

Example 9: Sulfur (S) Single Atom Supported on a Carbon Support

A carbon structure doped with sulfur (S) was manufactured in the same manner as in Example 1, except that a sulfur atmosphere was applied instead of a nitrogen atmosphere.

Example 10: Phosphorus (P) Single Atom Supported on a Carbon Support

A carbon structure doped with phosphorus (P) was manufactured in the same manner as in Example 1, except that a phosphorus atmosphere was applied instead of a nitrogen atmosphere.

Example 11: Nickel (Ni) and Boron (B) Single Atoms Supported Together on a Carbon Support A carbon structure doped with nickel (Ni) and boron (B) together was manufactured in the same manner as in Example 2, except that a boron atmosphere was applied instead of a nitrogen atmosphere, and $NiCl_2$ was used instead of $CoCl_2$.

Example 12: Cobalt (Co), Nickel (Ni) and Nitrogen (N) Single Atoms Supported Together on a Carbon Support A carbon structure doped with cobalt (Co), nickel (Ni) and nitrogen (N) together was manufactured in the same manner as in Example 2, except that a mixture of $CoCl_2$ and $NiCl_2$ was used instead of $CoCl_2$.

Evaluation Example 1: X-Ray Diffraction (XRD) Evaluation

X-ray diffraction (XRD) analysis was performed on the carbon structure doped with nitrogen (N) of Example 1 and the carbon structure doped with cobalt (Co) and nitrogen (N) together of Example 2, and the results are shown in FIG. 1.

As shown in FIG. 1, the XRD results of the carbon structures of Examples 1 and 2 showed a sharp 2θ diffraction peak at about 25°, indicating that the carbon structure was a crystalline structure. However, no peaks resulting from nitrogen (N) and cobalt (Co) were observed, indicating that nitrogen (N) and cobalt (Co) each were doped to the carbon structure at the level of a single atom rather than a large nanoparticle.

Evaluation Example 2: Evaluation of Optical Properties (SEM and TEM)

Figure 2:
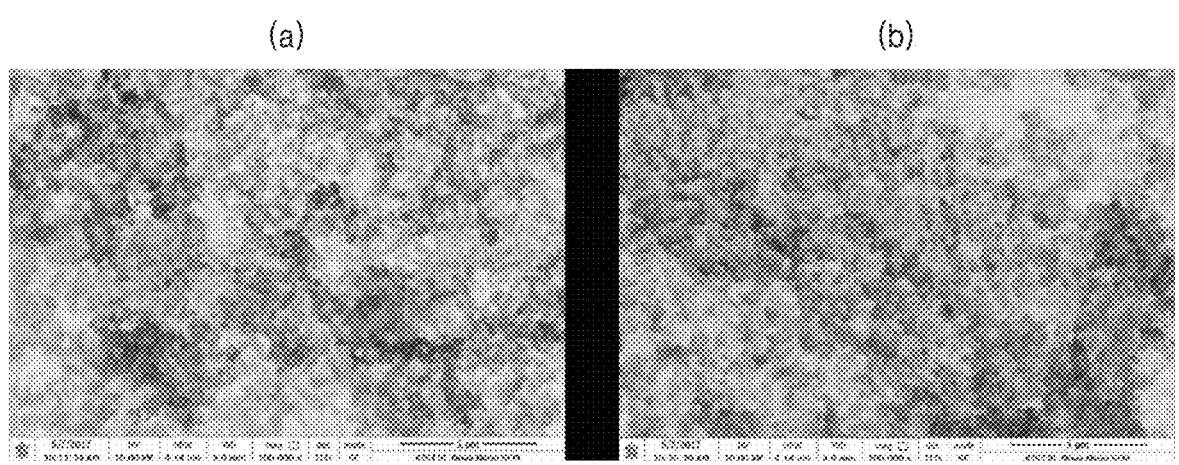
FIG. 2 is results of scanning electron microscopy (SEM) of (a) a carbon structure doped with nitrogen (N) of Example 1 and (b) a carbon structure doped with cobalt (Co) and nitrogen (N) together of Example 2.

Scanning electron microscopy (SEM) analysis was performed on the carbon structure doped with nitrogen (N) of Example 1 and the carbon structure doped with cobalt (Co) and nitrogen (N) together of Example 2, and the results are respectively shown in FIGS. 2 (a) and (b).

Figure 3:
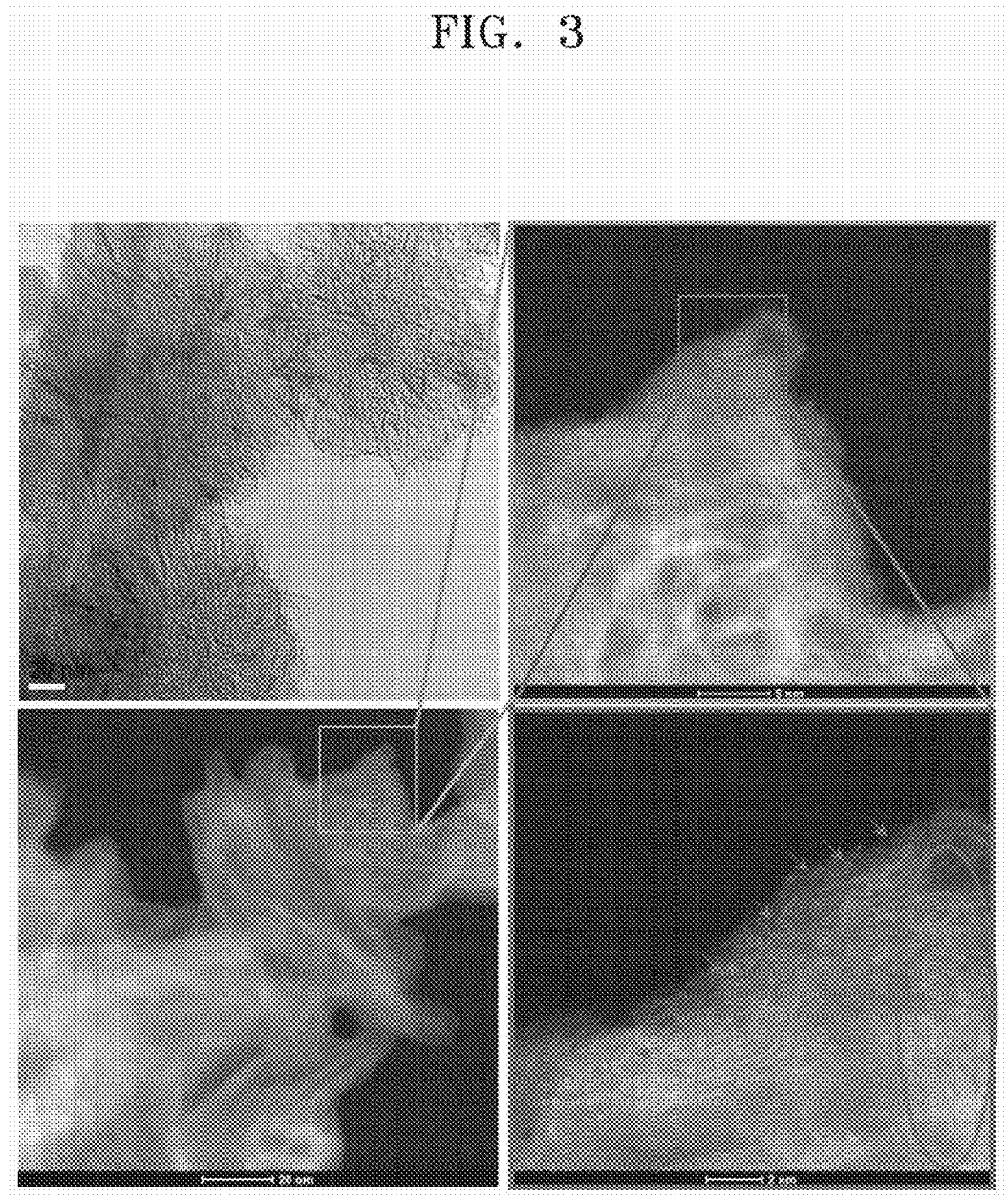
FIG. 3 is results of transmission electron microscopy (TEM) of (a) a carbon structure doped with nitrogen (N) of Example 1 and (b) a carbon structure doped with cobalt (Co) and nitrogen (N) together of Example 2.

In addition, transmission electron microscopy (TEM) analysis was performed on the carbon structure doped with nitrogen (N) of Example 1 and the carbon structure doped with cobalt (Co) and nitrogen (N) together of Example 2, and the results are shown in FIG. 3.

As shown in FIG. 2, both the carbon structure doped with nitrogen (N) and the carbon structure doped with cobalt (Co) and nitrogen (N) together exhibited a shape of a spherical carbon nanohorn having a constant shape and size. In addition, it was found that even in the structure of an atom-doped carbon nanohorn, a uniform spherical shape is well maintained without any specific changes in shape.

As shown in FIG. 3, similar to the results of scanning electron microscopy (SEM), both the carbon structure doped with nitrogen (N) and the carbon structure doped with cobalt (Co) and nitrogen (N) together exhibited a shape of a spherical carbon nanohorn having a constant shape and size. When viewed through transmission electron microscopy (TEM), it was found that the carbon nanohorn shape was well formed, and at low magnification, specific metal particles characteristics were not found, but when viewed at high magnification, particles having metallic characteristics were found to be dispersed at the level of an atom. In addition, it was found that the carbon nanohorn had an average diameter of about 20 nm to about 50 nm.

From the SEM and TEM results above, it was found that the doping of nitrogen (N) and cobalt (Co) does not affect the nanohorn shape of the carbon structure, indicating that nitrogen (N) and cobalt (Co) each were doped to the carbon structure at the level of a single atom rather than a large nanoparticle.

Example 13

An experiment was performed to find out the amount of a cobalt metal precursor and optimal conditions for ammonia heat treatment. Composite powder having different amounts of $CoCl_2$ adsorbed on a surface of graphite was manufactured by applying different amounts of a metal precursor mixed with graphite from low to high concentrations. The obtained composite powder was filled in a cylindrical negative electrode with an empty center, and then dried in an oven to remove moisture.

For are discharge, the negative electrode was introduced into a reaction chamber, and the chamber was charged with a nitrogen atmosphere, and then a voltage of 30 V and a current of 150 A were applied thereto for 5 minutes to generate an intense arc. The product was cooled and washed with ethanol to manufacture a carbon structure doped with various amounts of cobalt (Co) and nitrogen (N) together.

In addition, in order to create a stable and active coordination structure, heat treatment using ammonia was performed, and in this case, a catalyst having an optimal oxygen reduction reaction activity was synthesized by varying heat treatment temperatures.

Evaluation Example 3: X-Ray Photoelectron Spectroscopy (XPS) Evaluation

Figure 4:
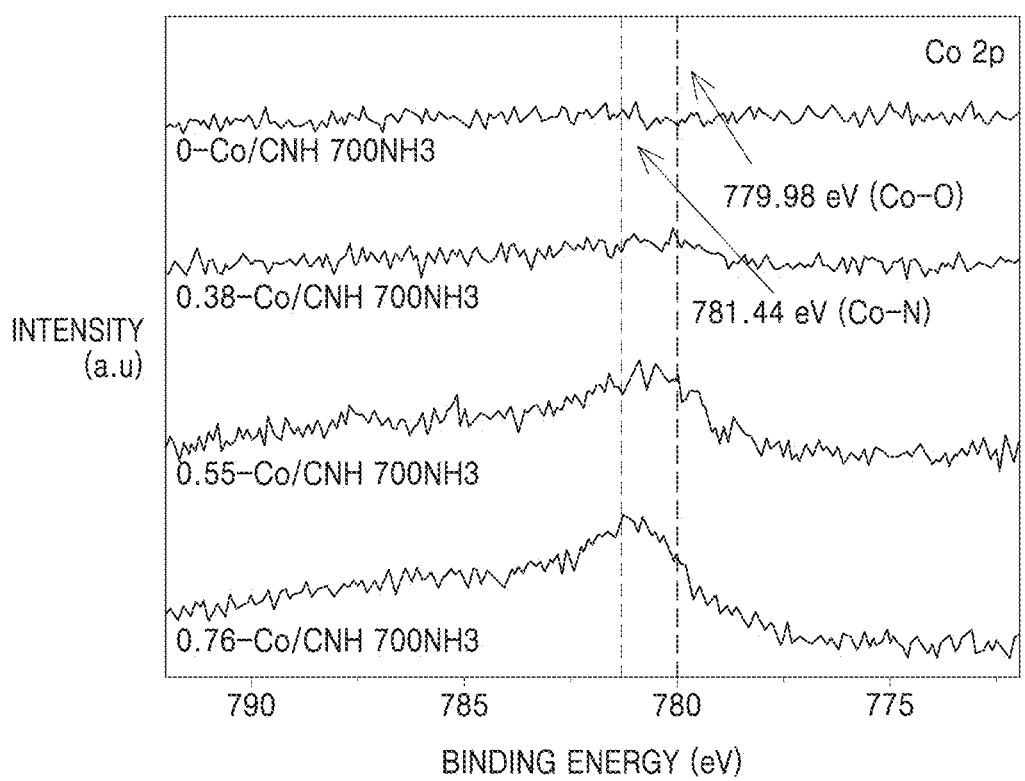
FIG. 4 is results of X-ray photoelectron spectroscopy (XPS) analysis for examining binding properties of cobalt to a carbon structure doped with cobalt and nitrogen together of Example 13.

X-ray photoelectron spectroscopy (XPS) analysis was performed to examine binding properties of cobalt for the carbon structure doped with cobalt and nitrogen together of Example 13, and the results are shown in FIG. 4. As shown in FIG. 4, it was found that, with an increase in the amount of the cobalt element, Co—N bonds were observed, indicating that more bonds between cobalt and nitrogen were generated.

Figure 5:
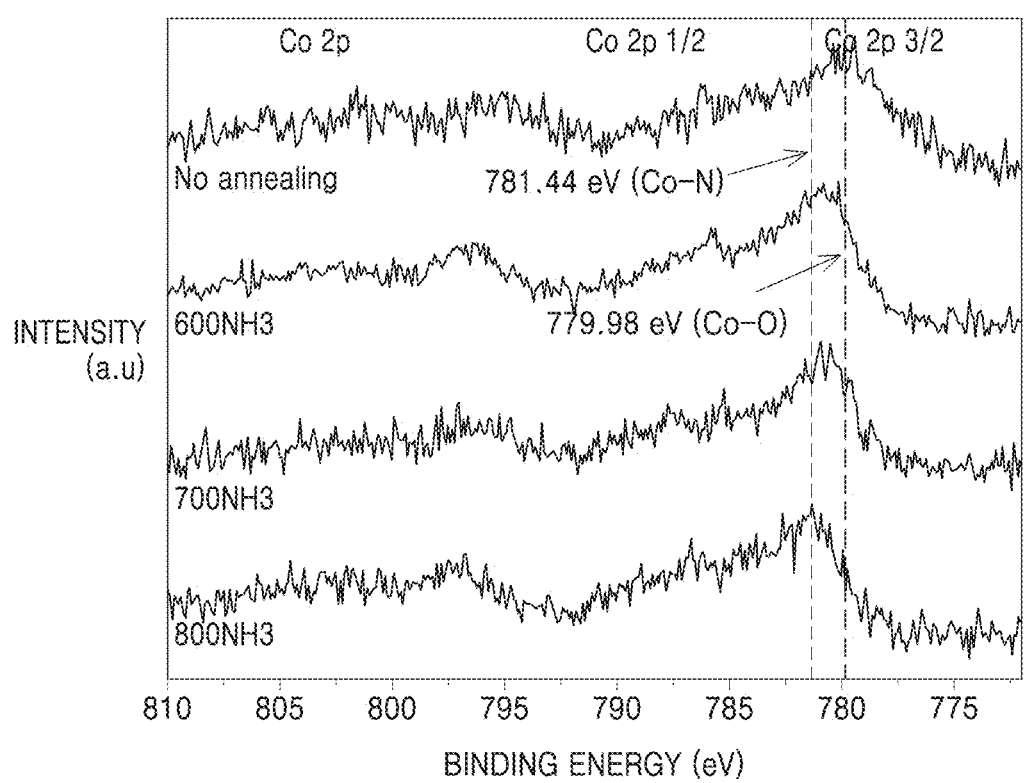
FIG. 5 is results of XPS analysis according to with/without ammonia heat treatment and temperature of the carbon structure doped with cobalt and nitrogen together of Example 13.

In addition, the XPS analysis results according to the ammonia heat treatment and temperature are shown in FIG. 5. As shown in FIG. 5, with no ammonia heat treatment or at low temperature, more bonds between cobalt and oxygen were observed, whereas at high temperature, more bonds between cobalt and nitrogen were observed, indicating that a single atom of cobalt coordinates with nitrogen.

Evaluation Example 4: Evaluation of Catalytic Activity

Figure 6A:
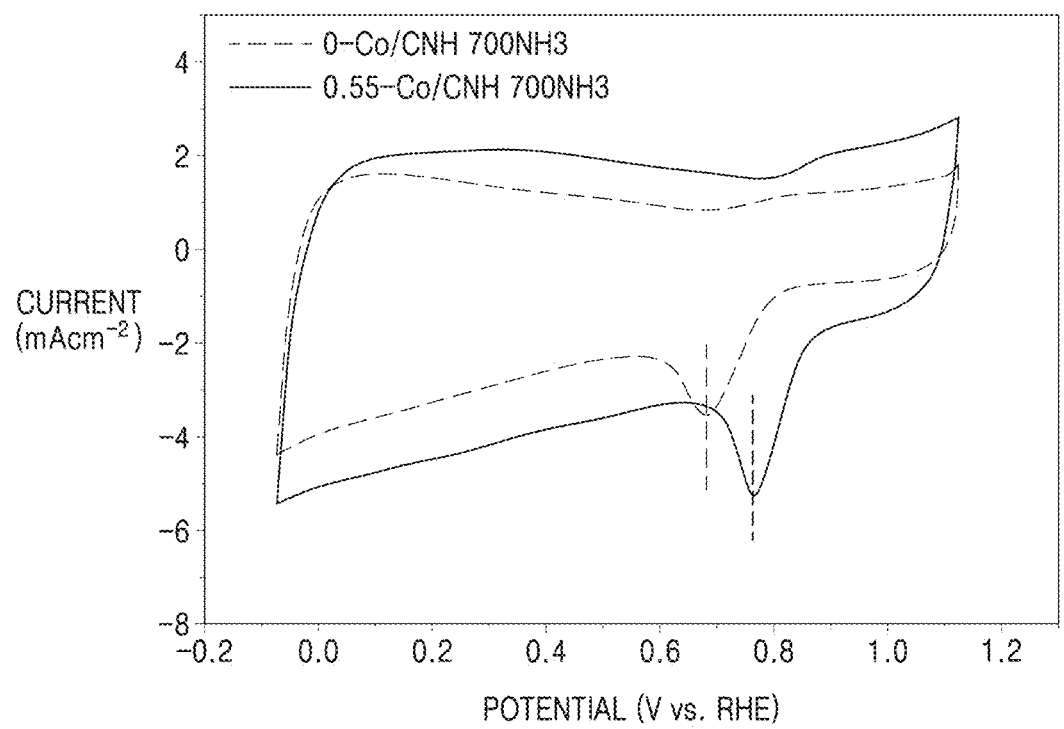
FIGS. 6A to 6C are linear sweep voltammetry (LSV) measurement results showing the catalytic activity of the carbon structure doped with cobalt and nitrogen together of Example 13.
Figure 6B:
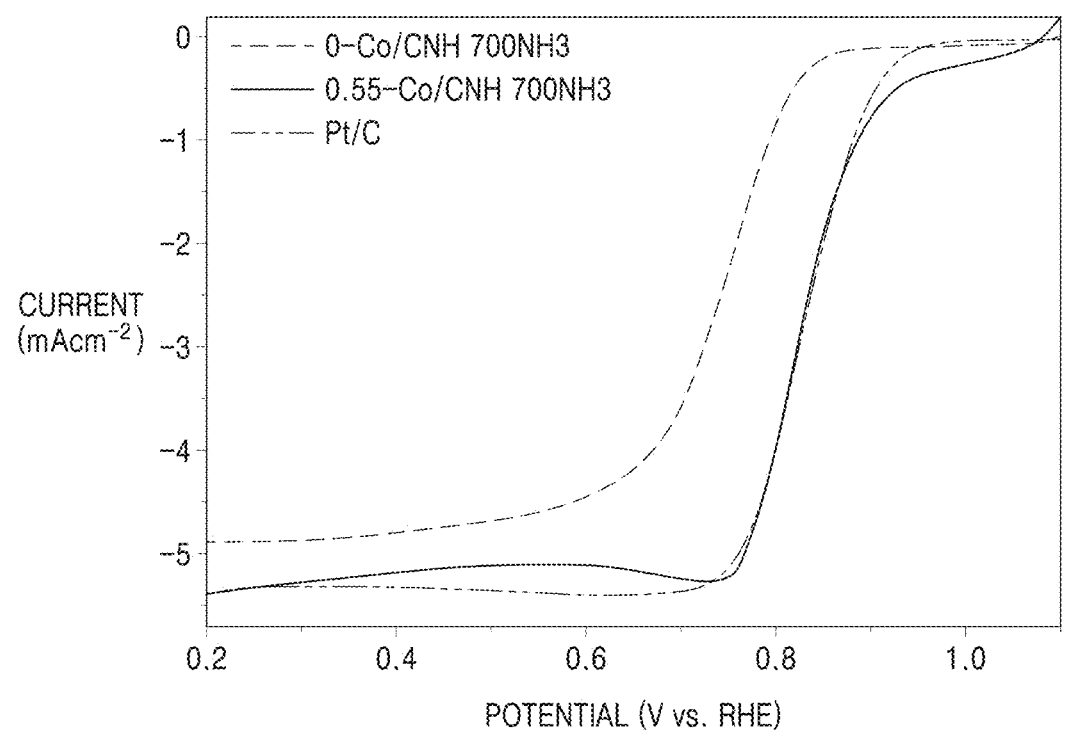
Figure 6C:
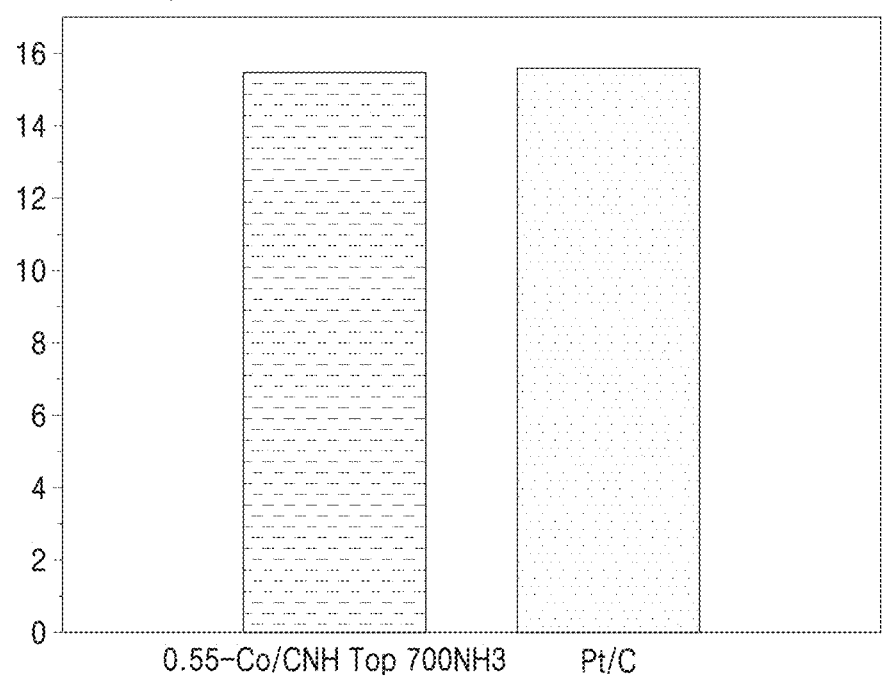

For the carbon structure doped with cobalt and nitrogen together of Example 13, linear sweep voltammetry (LSV) measurement was performed, and the results are shown in FIGS. 6A to 6C. As shown in FIGS. 6A to 6C, when cobalt was included, changes in reduction characteristics were found, indicating that cobalt was serving as a catalyst, and when oxygen reduction reaction was performed, cobalt was found to have high performance almost similar to a commercially available Pt catalyst.

Figure 7:
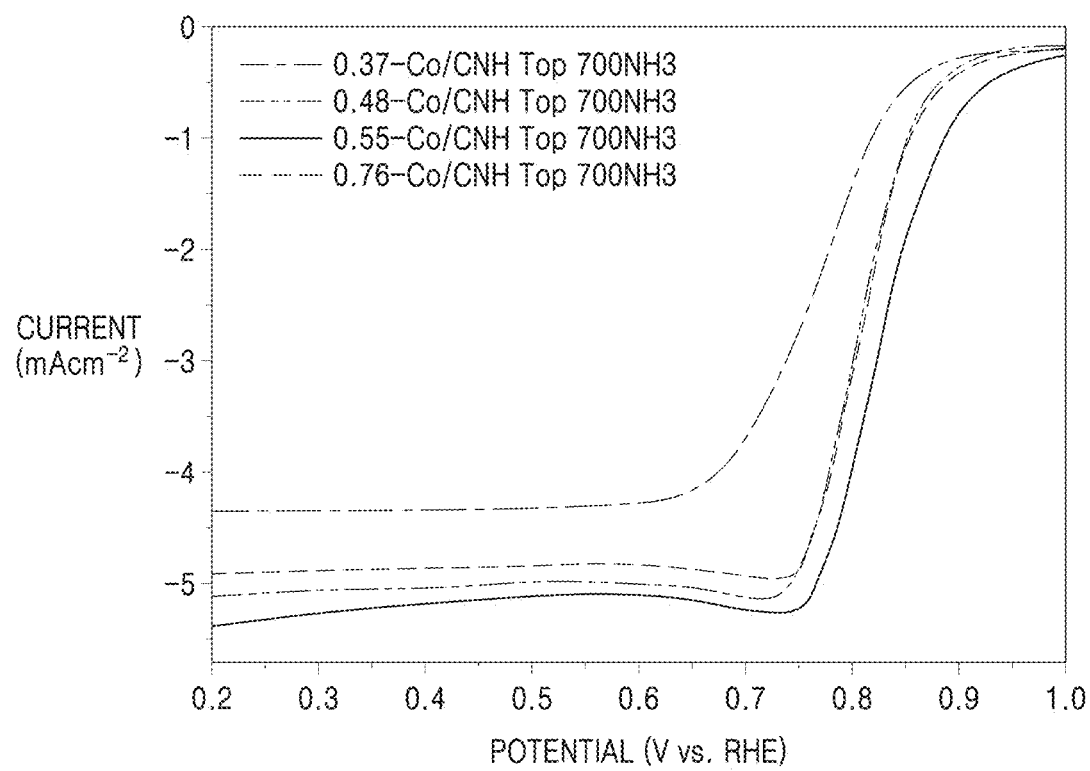
FIG. 7 is a graph of LSV results of measuring catalytic activity changes according to the amount of a cobalt element for the carbon structure doped with cobalt and nitrogen together of Example 13.

Meanwhile, FIG. 7 shows a graph of the LSV results of measuring catalytic activity changes according to the amount of a cobalt element. As shown in FIG. 7, with an increase in the amount of cobalt, single-atom catalyst points increase and thus, the activity increases, but when the amount of cobalt increases by more than a certain amount, the activity decreases due to aggregation.

Figure 8:
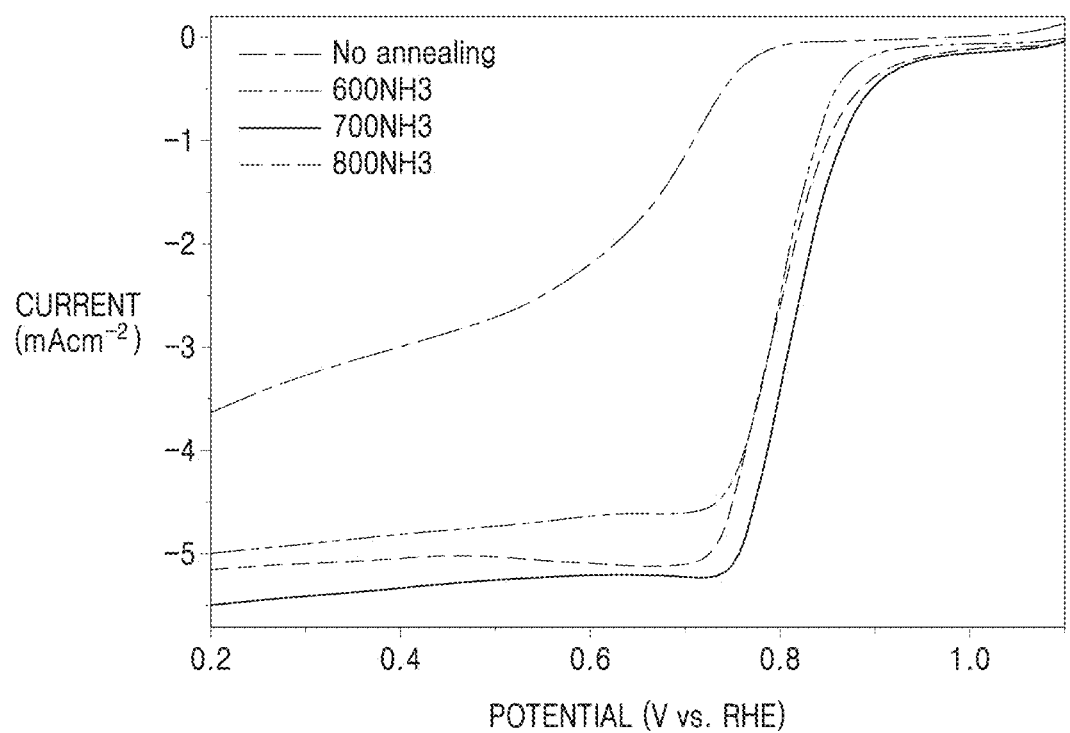
FIG. 8 is a graph of LSV results according to ammonia heat treatment temperature for the carbon structure doped with cobalt and nitrogen together of Example 13.

FIG. 8 shows a graph of the LSV results according to ammonia heat treatment temperature. As shown in FIG. 8, the increase in the activity up to 700° C. at the ammonia heat treatment temperature indicates that a cobalt single atom stably forms a coordination structure, and the decrease in activity from 800° C. indicates that the carbon structure collapses.

Figure 9:
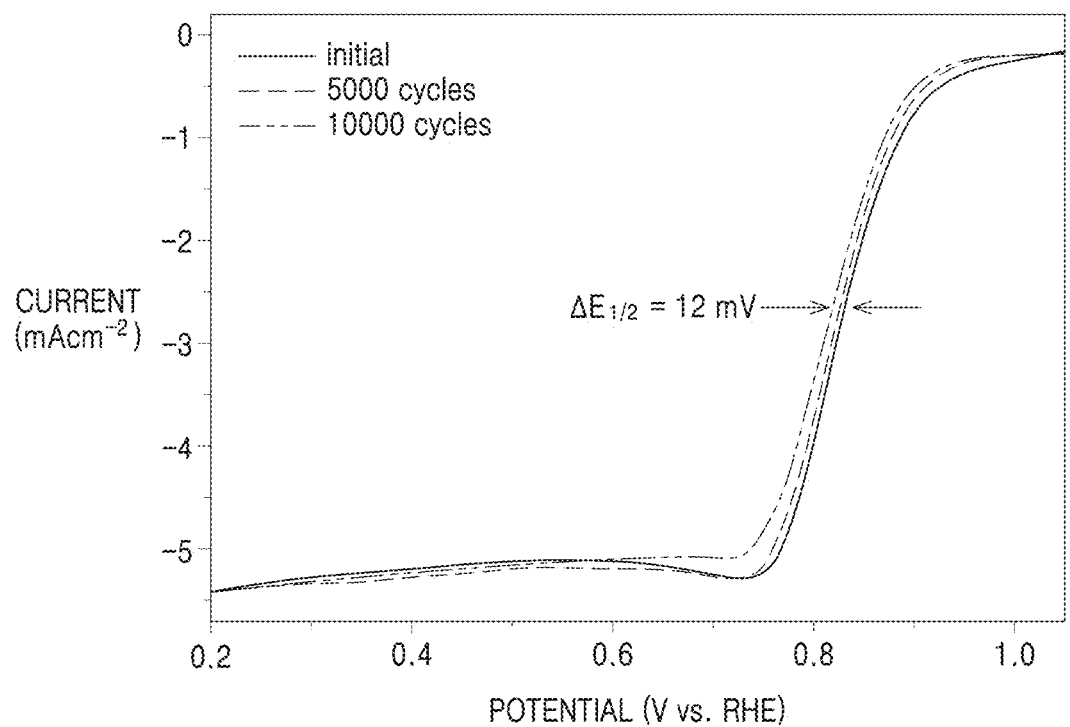
FIG. 9 is an LSV result graph showing catalytic activity life characteristics according to the number of redox cycles for the carbon structure doped with cobalt and nitrogen together of Example 13.

FIG. 9 shows a graph of LSV results showing catalytic activity life characteristics according to the number of redox cycles. As shown in FIG. 9, it was found that the manufactured single-atom catalyst has excellent stability, and the manufactured single-atom catalyst works quite stably even after 10,000 or more cycles.

While exemplary embodiments according to the disclosure have been shown and described with reference to drawings and examples, this is intended to be illustrative, and it will be understood by those of ordinary skill in the art that various modifications and equivalent arrangements may be made therein. Hence, the protective scope of the disclosure shall be determined by the scope of the appended claims.

INDUSTRIAL APPLICABILITY

According to an aspect, a method for manufacturing a single-atom catalyst supported on a carbon support, through a bottom-up approach, introduces a single-atom catalyst material into a carbon lattice when generating a carbon support, thereby manufacturing a single-atom catalyst supported on a carbon support having high crystallinity and a large specific surface area.

The single-atom catalyst supported on the carbon support has excellent electrical conductivity, and has excellent catalytic activity and selectivity as the single-atom catalyst is evenly dispersed on the carbon support.

The invention claimed is:

1. A method for manufacturing a single-atom catalyst supported on a precursor formed carbon support, the method comprising:
    treating a mixture of a precursor including carbon and a precursor of a hetero element other than carbon in a dry vapor phase process to provide a single-atom catalyst containing a hetero element other than carbon,
    wherein the single-atom catalyst is positioned on the precursor formed carbon support from the precursor including carbon during the dry vapor phase process,
    wherein the precursor formed carbon support comprises at least one of graphene, graphene oxide, fullerene, carbon nanotubes (CNT), carbon nanofibers, carbon nanobelts, carbon nanoonions, or carbon nanohorns.

2. The method of claim 1, wherein the precursor including carbon comprises at least one selected from graphite, $C_2H_2$, $CH_4$, $C_2H_4$, $C_2H_6$, or $C_2H_5OH$.

3. The method of claim 1, wherein the precursor of a hetero element other than carbon comprises: at least one non-metal-containing precursor including at least one non-metal selected from nitrogen (N), boron (B), sulfur (S), selenium (Se), phosphorus (P), fluorine (F), chlorine (Cl), bromine (Br), or iodine (I); at least one metal-containing precursor including at least one metal selected from Sc, Ti, V, Cr, Mn, Fe, Co, Ni, Cu, Zn, Y, La, Zr, Hf, Nb, Ta, Mo, W, Tc, Re, Ru, Os, Rh, Ir, Pd, of Pt, Ag, Au, Cd, Hg, Ga, Ge, In, Sn, Sb, Tl, Pb, Bi, a lanthanide metal, or an actinide metal; or a combination thereof.

4. The method of claim 3, wherein the at least one non-metal-containing precursor is a nitrogen-containing precursor comprising at least one of $N_2$, $NH_3$, $N_2H_4$, $R_xNH_{3-x}$ (R is a $C_1$ to $C_6$ alkyl group, and x is 1 or 2), $R_xN_2H_{4-x}$ (R is a $C_1$ to $C_6$ alkyl group, and x is an integer of 3 or less), a solid inorganic material containing a nitrogen element, or a nitrogen element-containing polymer.

5. The method of claim 3, wherein the metal-containing precursor comprises at least one of $CoCl_2$, $CoBr_2$, $Co(NO_3)_2$, $Co(OH)_2$, $Co(CH_3COO)_2$, $FeCl_2$, $FeBr_2$, $Fe(NO_3)_2$, $Fe(OH)_2$, $Fe(CH_3COO)_2$, $NiCl_2$, $NiBr_2$, $Ni(NO_3)_2$, $Ni(OH)_2$, $Ni(CH_3COO)_2$, $RhCl_2$, $RhBr_2$, $Rh(NO_3)_2$, $Rh(OH)_2$, $Rh(CH_3COO)_2$, $IrCl_2$, $IrBr_2$, $Ir(NO_3)_2$, $Ir(OH)_2$, or $Ir(CH_3COO)_2$.

6. The method of claim 1, wherein the precursor of a hetero element other than carbon comprises: at least one non-metal-containing precursor including at least one non-metal selected from nitrogen (N), boron (B), sulfur (S), or phosphorus (P); at least one metal-containing precursor including at least one metal selected from Ti, V, Cr, Mn, Fe, Co, Ni, Cu, Zn, Mo, W, Ru, Rh, Ir, Pd, Pt, Ag, Au, Cd, Ga, Ge, In, Sn, Sb, or Tl; or a combination thereof.

7. The method of claim 1, wherein the precursor of a hetero element other than carbon comprises: at least one non-metal-containing precursor containing at least one non-metal selected from nitrogen (N), boron (B), sulfur (S), or phosphorus (P); at least one metal-containing precursor containing at least one metal selected from Co, Fe, Ni, Rh, or Ir; or a combination thereof.

8. The method of claim 1, wherein the amount of the precursor of a hetero element other than carbon in the mixture is about 0.01% by weight to about 10% by weight with respect to the total weight of the precursor including carbon.

9. The method of claim 1, wherein the dry vapor phase process is performed through at least one process among arc discharge, thermal chemical vapor deposition, plasma synthesis, high-temperature plasma, plasma-enhanced chemical vapor deposition, laser evaporation, laser ablation, and vapor phase growth.

10. The method of claim 1, wherein the dry vapor phase process is performed through arc discharge at a voltage of about 10 V to about 100 V and a current of about 10 A to about 300 A.

11. The method of claim 1, wherein the precursor formed carbon support has at least one structure selected from a spherical shape, a rod shape, a tube shape, a horn shape, or a plate shape.

12. The method of claim 1, wherein the precursor formed carbon support has a horn-shaped structure.

13. The method of claim 1, wherein the precursor formed carbon support has an average diameter of about 1 nm to about 10 μm.

14. The method of claim 1, wherein the hetero element other than carbon comprises: at least one non-metal selected from nitrogen (N), boron (B), sulfur (S), selenium (Se), phosphorus (P), fluorine (F), chlorine (Cl), bromine (Br), or iodine (I); at least one metal selected from Sc, Ti, V, Cr, Mn, Fe, Co, Ni, Cu, Zn, Y, La, Zr, Hf, Nb, Ta, Mo, W, Tc, Re, Ru, Os, Rh, Ir, Pd, of Pt, Ag, Au, Cd, Hg, Ga, Ge, In, Sn, Sb, Tl, Pb, Bi, a lanthanide metal, or an actinide metal; or a combination thereof.

15. The method of claim 14, wherein the metal comprises at least one of cobalt (Co), iron (Fe), nickel (Ni), rhodium (Rh), or iridium (Ir).

16. The method of claim 1, wherein the hetero element other than carbon comprises nitrogen (N), cobalt (Co), or a combination thereof.

17. The method of claim 1, wherein the supported amount of the single-atom catalyst is about 0.01% by weight to about 10% by weight with respect to the total weight of the precursor formed carbon support.

18. The method of claim 1, wherein the single-atom catalyst is an electrochemical catalyst.

19. A single-atom catalyst supported on the precursor formed carbon support manufactured through the manufacturing method according to claim 1.

20. The method of claim 1, wherein the single-atom catalyst is a chemical reaction catalyst.

21. A method for manufacturing a single-atom catalyst supported on a carbon support, the method comprising treating a mixture of a precursor including carbon and a precursor of a hetero element other than carbon in an arc discharge process to provide a single-atom catalyst containing a hetero element other than carbon on a carbon support;
    wherein the arc discharge process is conducted at a voltage of about 10 V to about 100 V and a current of about 10 A to about 300 A.

* * * * *